United States Patent [19]

Gloden et al.

[11] Patent Number: 5,590,091

[45] Date of Patent: Dec. 31, 1996

[54] WAVEGUIDE SUSPENSION DEVICE AND MODULAR CONSTRUCTION FOR SONIC WAVEGUIDES

[75] Inventors: Michael L. Gloden, Apex; Arnold F. Sprecher, Jr., Raleigh, both of N.C.

[73] Assignee: MTS Systems Corporation, Eden Prairie, Minn.

[21] Appl. No.: 500,335

[22] Filed: Jul. 10, 1995

Related U.S. Application Data

[63] Continuation-in-part of Ser. No. 439,507, May 11, 1995.
[51] Int. Cl.⁶ .................................................. H04R 15/00
[52] U.S. Cl. .................................... 367/140; 324/207.13
[58] Field of Search ...................... 367/140; 324/207.13; 333/148

[56] References Cited

U.S. PATENT DOCUMENTS

| | | | |
|---|---|---|---|
| 3,898,555 | 8/1975 | Tellerman | 324/207.13 |
| 4,721,902 | 1/1988 | Tellerman et al. | 324/207.13 |
| 4,939,457 | 7/1990 | Tellerman | 324/207.13 |
| 4,952,873 | 8/1990 | Tellerman | 324/207.13 |
| 4,958,332 | 9/1990 | Tellerman | 367/140 |
| 5,313,160 | 5/1994 | Gloden et al. | 324/207.13 |
| 5,514,961 | 5/1996 | Stol et al. | 324/207.13 |

*Primary Examiner*—Daniel T. Pihulic
*Attorney, Agent, or Firm*—David M. Ostfeld

[57] ABSTRACT

A wave guide suspension device and modular construction for sonic waveguides, including a damping element for use with a waveguide that supports a current pulse and results in a torsional or longitudinal strain wave, is disclosed. The damping element is to prevent the reflection of the sonic strain wave and includes a sleeve surrounding the waveguide and a mechanism for applying pressure on the sleeve so the sleeve exerts pressure on the waveguide, thereby gradually dampening the sonic strain wave energy along the length of the waveguide surrounded by the damping element sleeve to prevent reflection of the sonic strain wave. Further, the return wire placement is determined by measuring system response to provide minimal ringing of the signal received from a pickup coil. In addition, the suspension mechanism is used to contain the waveguide thereby avoiding extraneous noise. Finally, a bracket is disclosed that facilitates the process of assembly of the waveguide assembly.

61 Claims, 10 Drawing Sheets

WAVEGUIDE SUSPENSION DEVICE AND MODULAR CONSTRUCTION FOR SONIC WAVEGUIDES

CROSS REFERENCE TO RELATED APPLICATION

This application is a continuation in part of U.S. application Ser. No. 08/439,507, filed May 11, 1995, to Gloden, et al, entitled "Waveguide Suspension Device in Modular Construction for Sonic Waveguides".

BACKGROUND OF THE INVENTION

1. Field of the Invention

The present invention relates to waveguide suspension devices for elongated wave guides in magnetostrictive displacement or distance measuring transducers, and more particularly to modularly constructed magnetostrictive transducers having waveguide suspension and modular construction including for displacement or distance measuring.

2. Description of the Art

Magnetostrictive transducers having elongated waveguides that carry torsional strain waves induced in the waveguide when current pulses are applied along the waveguide through a magnetic field are well known in the art. A typical linear distance measuring device using a movable magnet that interacts with the waveguide when current pulses are provided along the waveguide is shown in U.S. Pat. No. 3,898,555.

Devices of the prior art of the sort shown in U.S. Pat. No. 3,898,555 also have the sensor element embedded into the protective housing which also houses the electronics to at least generate the pulse and provide certain mounting means associated with the device for the customer.

U.S. Pat. No. 5,313,160 teaches a modular design in which the sensor and electronic assembly can be removed from the application package. In the application package is the outer housing which is used by the customer for mounting an attachment of the sensor and electronics assembly with the end device whose position is to be measured.

Sensor designs of the past have required delicate handling until the fabrication of the total unit, including outer housing and electronics, has been completed. Prior art also utilizes difficult to produce and expensive methods to suspend the waveguide and to prevent the reflection of the desired sonic strain wave. Prior high performance waveguide suspension systems utilize thin elastomer spacer discs which are individually positioned along the entire length of the waveguide. Installation of the discs is a time consuming, usually manual operation. The best performing damping devices in use utilize molded rubber elements with a central hole. These are difficult to mold and time consuming to apply.

Further damping devices for waveguide are illustrated in U.S. Pat. No. 3,898,555, to prevent reflected sonic strain waves at both the remote end of the waveguide and the mounted end of the waveguide. These devices generally are soft rubber pads that are clamped about the waveguide to absorb sonic strain wave energy to minimize reflections of the generated pulse and reduce interference of the reflections with the sonic strain wave signals to be sensed. The damping devices and the arrangement for anchoring the waveguide at a remote end may take up a substantial length at the end remote from the pick-up element of a sonic waveguide for prior art of this sort, as discussed in U.S. Pat. No. 3,898,555. Where liquid levels, for example, are being sensed by the transducers, it is desirable to have the waveguide operable and active as close to the bottom of the tank as possible, thereby minimizing the length of the waveguide support at its remote end from the pick-up element, including the length of the separate damping device at such end, and at the mounted end of the waveguide, where the pick-up element is mounted.

In addition, in the prior art, the mass density of the damping material may be quite important to provide a mechanical impedance such that the sonic strain wave energy can be transferred into the damping device and dissipated. The coupling of the waveguide to the damping device must also be effective. The dissipation of the sonic strain wave energy by the damping medium has been thought in the prior art to provide the damping.

It is also known in the art to use gum type damping media because of the ability to attenuate or damp vibration but such materials harden at temperatures which are near the freezing point of water and become extremely soft at temperatures well below 200 degrees Fahrenheit. The same is true for epoxy or urethane elastomers, and such large changes in characteristics change the "front" end reflection and the "extreme" end reflection characteristics drastically with temperature.

It is also known in the art to use silicone rubber dampers of two different durometers and/or different loading pressure against the waveguide. Lower pressure and lower durometer silicone rubber has been utilized to minimize front end reflection (input end) while higher durometer silicone rubber in conjunction with greater clamping pressures has been utilized to provide damping at the remote or termination end. This use of silicone rubber was believed to be a compromise as a damping medium because of its high resilience, which leads to the need for long damping sections. Silicone rubber does have good stability over a wide temperature range which is an important benefit for damping materials.

The need for an effective damp material is especially evident when the transducer uses what is known as recirculation mode sensing. In the recirculation mode, each time the sensor receives a sonic strain wave signal, a new current pulse is sent, and this leads to a high frequency of sonic strain wave pulses and a build up of noise as a result of reflections. If effective damping is not provided, "noise" build-up reduces the usefulness of the sensing technique, especially since the sonic strain wave signal is known in the prior art to be of low amplitude. Thus, in the prior art, it was ideal for the damp material to be capable of being kept short, along with the end mounting structure for the waveguide, to have good coupling to the waveguide itself, and to have the ability to dissipate energy, the total of which is not well achieved in the prior art. For other approaches raising signal strength, see U.S. Pat. No. 4,952,873.

An alternate methodology for damping is set out in U.S. Pat. No. 4,958,332. This patent teaches an improved damping method. The damping device comprises a highly viscous, flowable material that adheres to and couples to the waveguide, and which can have mass density changing additions, such as metallic powder, to vary the mass density along its length. The damping material is held against the waveguide with a suitable housing which can be loaded against the waveguide with pressure as selected. While such a method is effective, it is difficult to produce.

Also in the prior art, two half pieces (flat sheets) of rubber have been used to enclose a waveguide with a metal clamp to retain them around the waveguide and apply pressure to the waveguide at the input side, but this is fairly expensive.

The prior art has deficiencies in that the electronics are included within the waveguide suspension device, an expensive means for waveguide suspension is utilized and the prior art does not disclose the relationship between the waveguide suspension mechanism and the damping mechanism.

U.S. Pat. 4,952,873 also discloses a waveguide mounting block supporting a waveguide at the mounting end to provide a reflection point for the sonic waves. The block is precisely positioned a distance from the signal sensor that is travelled by the sonic wave during one-half of the signal lobe time period so that the reflected wave becomes an additive signal to the incoming sonic wave. Others in the prior art have chosen the length of the waveguide without a mounting block to accomplish the same purpose.

For general background information, see "Ultrasonic Level, Temperature and Density Sensor" by S. C. Rogers and G. N. Miller, IEEE Transactions on Nuclear Science, Vol. NS-29, No. 1, February 1982.

It is an object of the present invention to produce a waveguide suspension mechanism and damping mechanism which are easy to produce and assemble.

It is a further object of the present invention to facilitate packaging options based on a removable, interchangeable sensor element.

It is an additional object of the present invention to provide a robust sensor element suitable for customers to incorporate into their products.

SUMMARY OF THE INVENTION

The present invention relates to a remote end structure for an elongated member, such as a waveguide used with a magnetostrictive displacement or distance measuring transducer, that adequately prevents reflected waves, such as torsional or longitudinal strain waves, and does not take up a substantial length at the remote end. Thus, for example, the waveguide is operable and active close to the end of the elongated member, while the remote end structure prevents reflection of sonic strain waves that are transmitted along the waveguide.

The suspension is accomplished first by restriction of the elongated member movement, as well as shielding it from external sonic energy. In this manner, shock and vibration stimuli which can cause erroneous responses are also eliminated. This is accomplished by surrounding the elongated member, such as the waveguide, with a suspension element or sleeve sized such that the waveguide is in loose contact with it, yet the sleeve does not allow excessive lateral movement. The fiber used to make the sleeve is a fine, hard material, or a combination of materials such as ceramic or metal or polymer or glass. The sleeve may also be a composite tubing of different material layers. The tubing may be a composite rubberized glass fiber tube construction. An enclosure may also fit over the sleeve. Thus, the elongated member, such as the waveguide, is cushioned in the enclosure. The actual damping is achieved by a damping element slipped over the end of the waveguide. The damping element is similar to the suspension element but sized to provide optimum damping. The end facing the transducer head is cut at about a 45° angle in order to more properly match impedance with the elongated member, such as the waveguide.

The suspension is further accomplished by terminating the waveguide at a bracket which is used to hold the waveguide and the return wire in spaced relationship to a pick-up coil and magnet and to permit attachment of the waveguide to a tape inserted into the pick-coil.

The electronics for pulse signal generation for transmission along the waveguide is not included in the electronics of the modularly constructed magnetostrictive transducer. The device electronics includes the fundamental signal.

DESCRIPTION OF THE DRAWINGS

For a further understanding of the nature and objects of the present invention, reference should be had to the following figures in which like parts are given like reference numerals.

DETAILED DESCRIPTION OF THE PREFERRED AND ALTERNATE EMBODIMENTS

Figure 1:
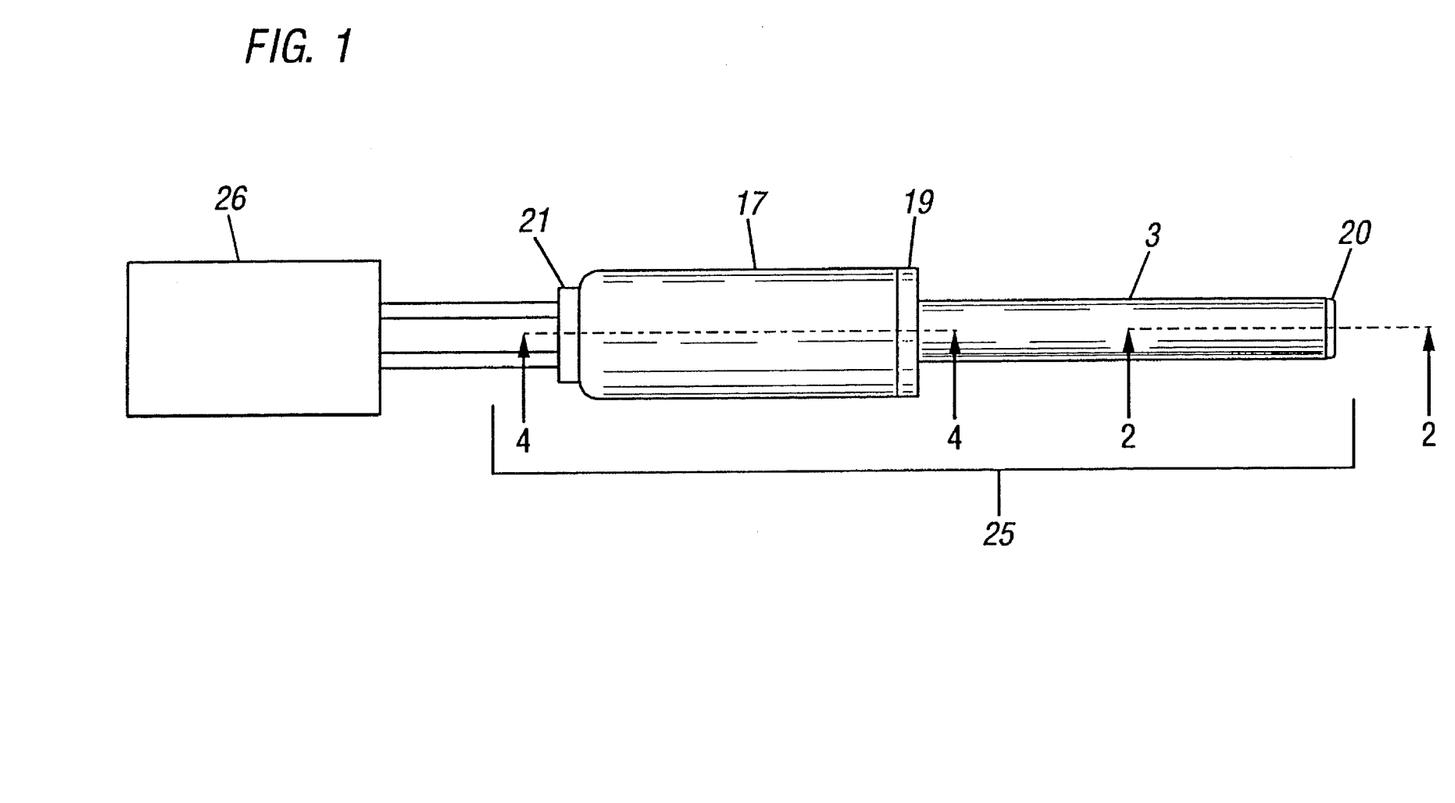
FIG. 1 depicts a side elevated view of the complete sensing element assembly.

A transducer or sensing element assembly, which may be any transducer, including those of the prior art such as that shown in U.S. Pat. No. 3,898,555 or any other transducer presently on the market or may be introduced in the future, for purposes of the damping element, is shown indicated at 25 in FIG. 1. Transducer 25 may be used for measuring displacements and/or distances or other measurements, and the damping device of the present invention will be applicable to any of them. The type of transducer that may be used for the present invention, should not be considered to be limited by the disclosure of the damping element used with the transducer. Further, except for mechanical construction indicating a preferred mechanical mounting of the waveguide, the general type of transducer should not be deemed to be limited by the disclosure of the waveguide suspension. The transducer should not be deemed to be limited to any particular type of electronics used with the waveguide except for the local buffer circuit. Additionally, the general type and nature of a transducer in electrically producing the return pulse and interfacing through the return pulse with any electronics of a buyer or user of the device should not be deemed to be limited by the disclosure except for the mechanical construction shown for the preferred embodiment and the printed circuit board containing the local buffer circuit.

The transducer 25 includes an elongated waveguide assembly enclosed in an enclosure tube 3. Enclosure tube 3 and the waveguide assembly are mechanically supported at one end by a housing 17 through an end flange 19. The waveguide assembly includes the outer enclosure tube 3 surrounding a coaxial elongated interior waveguide 4 (FIG. 2). Whenever "FIG. 2" is referenced in this specification, it means any of the embodiments of FIGS. 2a–2d. A current is passed through the waveguide 4 and returns through a return wire 1 electrically connected to the waveguide 4. Typically, a magnet (not shown) is mounted over the waveguide assembly and enclosure tube 3 by being placed over and coaxial with enclosure tube 3. The magnet interacts with the current pulse as more completely described in U.S. Pat. No. 3,898,555. Upon the strain wave pulse returning to the housing 17 after passing through the waveguide 4 and return wire 1, the placement of waveguide 4 and returned wire 1 being more completely described below, a suitable mode converter (partially shown) of any type known or to be known in the art provides an electrical signal through connector 21 to any electronic circuit connected to it, such as electronic circuit 26.

The structure of the circuit 26 is dependent on the use of transducer 25, and will work with the waveguide suspension sleeve 2 and modular construction elements of the present invention despite disparities in structure. The structure of circuit 26 should not be considered as limiting the invention. Thus, no particular mechanism for the arrangement of the element 26 or any conditioning of the signal to circuit 26 is shown to be preferred to emphasize generality. Further, it should be understood that the waveguide suspension sleeve 2 mechanism of the present invention is applicable to any transducer 25 and waveguide 4 of the type for measuring displacement and/or distance and/or other measurement using the magnetostrictive principles, such as generally shown in U.S. Pat. No. 3,898,555, but is dependent for modular assembly to some extent on the mechanical arrangement of elements in housing 17. Thus, for example, a particular mechanism for the arrangement of the elements in the housing 17 is shown to be preferred for mounting, but otherwise should not limit generality. The mechanism other than mounting may be of any sort, including such as those shown in U.S. Pat. No. 3,898,555 or others known in the art or still to be thought of in the art or that are in design in the art. For this same reason, the type of magnet used and the type of application used is also not shown, and may be any application. Finally, because there is some need to show the interaction between the damping element 6 (FIG. 2) and the waveguide suspension sleeve 2 and other portions of transducer 25 at the remote portion of the waveguide assembly, a preferred embodiment for an enclosure tube 3 (FIG. 2), discussed below, with the waveguide suspension sleeve 2 and damping element 6 is shown. This should not be considered as limiting but only illustrative, the waveguide suspension sleeve 2 being capable of use with any type of waveguide assembly as set out above.

The remote end portion of enclosure tube 3, remote from housing 17, is shown in cross-section in FIG. 2 and ends with an end plug 20. An inert gas may be introduced in enclosure tube 3 to further promote isolation and sealing. End plug 20 acts to stop fluid and other materials from entering enclosure tube 3. The end of the waveguide assembly, having end plug 20, is normally the end which would be at the bottom of a tank, if transducer 25 is being used for determining the level of liquid in a tank, or at the end of the displacement if the transducer 25 were used to measure distance. As discussed in the Background, it is desired to make the dead zone, or non-signal producing zone, adjacent to the end plug 20 as short as possible and yet accomplish the purpose of dampening the sonic strain wave signal to prevent reflected strain waves from interfering with the desired return strain wave signal that represents distance or level, such as discussed in U.S. Pat. No. 3,898,555.

As shown in FIG. 2, a waveguide 4 is enclosed through concentrically layered enclosure mechanisms, including a suspension sleeve 2 and enclosure tube 3. The suspension sleeve 2 comprises a tubular braided sleeve, or elastomer sleeve, or composite sleeve, of a geometry having the characteristics of restricting the lateral movement of the waveguide 4 and insulating the waveguide 4 from vibration and external sonic noise yet not contacting the waveguide 4 so much as to damp the sonic strain wave signal generated by the interaction of the electric current and external magnet. Suspension sleeve 2 is coaxial with and surrounds the waveguide 4 for substantially its entire length, or at least a major portion thereof. Suspension sleeve 2 is shown mounted within and coaxial for substantially the entire length of waveguide 4, or at least a major portion thereof, with outer enclosure tube 3.

The inner diameter of the suspension sleeve 2 must be small enough to limit the movement of the waveguide 4 yet large enough so that it does not hold, grab, constrict or otherwise compress the waveguide 4. If suspension sleeve 2 compresses, holds, grabs or constricts the waveguide 4, attenuation of the sonic strain wave signal along waveguide 4 will occur. The Wiedemann Effect does not promote a large sonic strain wave signal in the prior art, making it difficult to differentiate it from noise produced by other mechanisms. Accordingly, signal attenuation is known in the prior art to be a phenomenon to be avoided.

The outer diameter of suspension sleeve 2 must be large enough to restrict lateral movement of suspension sleeve 2 within enclosure tube 3, yet small enough to fit easily within the inner diameter of the enclosure tube 3, together with the return wire 1 as will be discussed below. Also, it may be possible to have the suspension sleeve 2 present without requiring the restriction of an enclosure tube 3, and the use of an enclosure tube 3 should not be considered limiting to the invention or even to the waveguide suspension. Overall, the waveguide 4 must be suspended in a manner that cushions it from shock and vibration stimuli so that associated erroneous responses are eliminated.

Suspension sleeve 2 includes an inner layer 27 and an outer layer 29. The fiber that makes up inner layer 27 of suspension sleeve 2 is non conducting and may be a fine, hard material, or a combination of materials such as ceramic or glass or metal or polymer. The strand count and weave configuration are typically from eight to sixteen strands in diamond, regular, hercules or other weave pattern. Such strand, count and weave configuration of such fiber enable the suspension sleeve 2 to act as a cushion between the waveguide 4 and the enclosure tube 3. Interior to the inner layer 27 and exterior to the waveguide 4, there is clearance 28 such that the inner layer 27 is loosely fitting around waveguide 4. The outer layer 29 of suspension sleeve 2 helps to maintain the shape of the inner layer 27, and isolate it from the enclosure tube 3. The outer layer 29 is typically a softer material, such as a silicone rubber and is a second layer of inner layer 27.

Figure 2A:
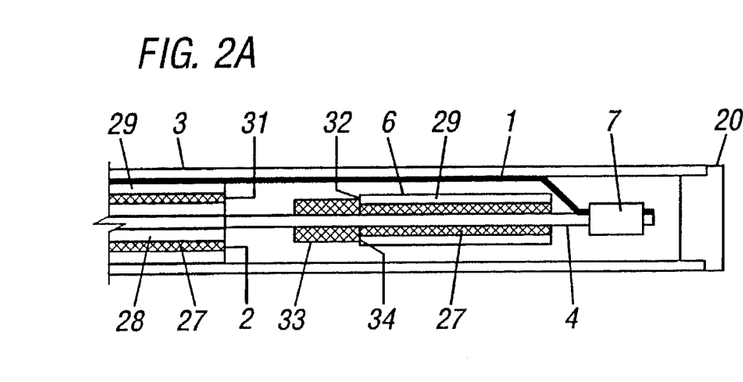
FIG. 2a is a cross-sectional view of the sensing element assembly of the preferred embodiment of the present invention of FIG. 1 taken along section lines 2—2 of FIG. 1 showing a portion of the waveguide and surrounding sleeves showing the damping element at the end of the waveguide.
Figure 2B:
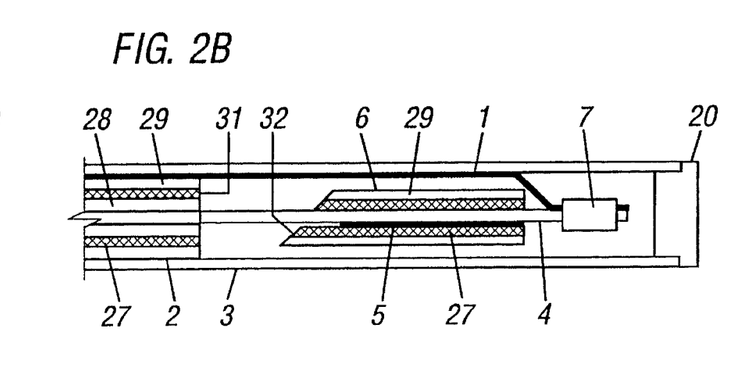
FIG. 2b is the same cross-sectional view of FIG. 2a, but showing a first alternative of using a tuning wire between the damping element and the waveguide.

Suspension sleeve 2 ends at its remote side at end 31 facing toward the end plug 20. Juxtaposed with the end 31 of the suspension sleeve 2 is damping element 6. Damping element 6 is slipped over the end of the waveguide 4 and is coaxial with waveguide 4 and generally cylindrical in shape, as is suspension sleeve 2. However, the damping element 6 is not loose fitting over the waveguide 4, but is more constrictive over waveguide 4 in order to provide damping. Thus, as shown in FIGS. 2a and 2b, the inner layer 27 of damping element 6 snugly fits about waveguide 4. Further, the outer layer 29 of damping element 6 while usually of softer elastomer materials, such as silicone rubber, does not normally contact enclosure tube 3, as does outer layer 29 of suspension sleeve 2, but instead is sized to control the amount of and to exert pressure on the inner layer 27 which in turn exerts pressure on the waveguide 4. Thus, a space is left between the outer layer 29 of damping element 6 and the inner surface of enclosure tube 3.

In addition, a tuning wire 5 (see FIG. 2b) of a diameter ranging from 0.005 inches to 0.016 inches may be used to act as a wedge, thereby controlling the pressure of inner layer 27 on the waveguide 4. The tuning wire 5 is adjacent to waveguide 4 and extends substantially along and is enclosed by inner layer 27 of damping element 6. It is used to change the acoustic impedance of the damping element 6 but to do so gradually so that the sonic strain wave signal is dampened gradually along the distance of the waveguide 4 enclosed by damping element 6. In this way, no reflection will occur from sudden changes in impedance, but instead damping of the sonic strain wave amplitude along the damping element 6 will occur. It should be noted that the tuning wire 5 while only shown in FIG. 2b may be used with any of the configurations of FIGS. 2a–2d and may be used in any other kind of damping element for the purposes set out above.

Figure 2C:
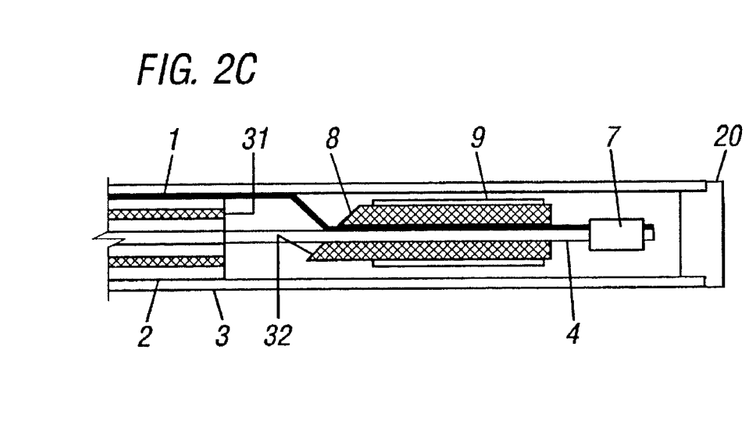
FIG. 2c is the same cross-sectional view as FIG. 2a, but shows a second alternative of external tube crimped over the damping element.
Figure 2D:
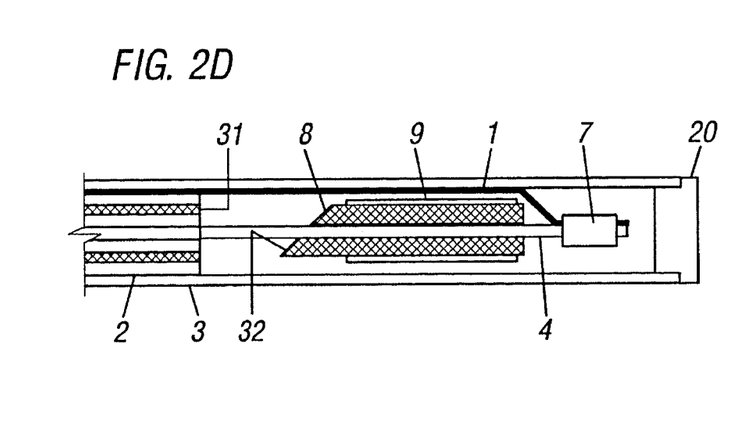
FIG. 2d is the same cross-sectional view of FIG. 2a, but shows a third alternative of the return wire in a different position and with an external tube crimped over the damping element.

Further, because damping element 6 is used to provide optimum damping of the sonic strain wave pulse traveling in the waveguide 4, and because proper acoustic matching of the waveguide 4 and the damping element 6 is determined by the pressure exerted on the waveguide 4 by the inner layer 27, there are other mechanisms besides the tuning wire 5 that can be used. As shown in FIGS. 2c and 2d, a damping element 6 for use over a broad temperature range could be used, comprising a short braided sleeve 8 of the sort of inner layer 27, but with such braided sleeve 8 inserted into a coaxial, larger diameter metal sleeve 9. This assembly of sleeves 8, 9 is slipped onto the end of the waveguide 4. The metal sleeve 9 may then be crimped such that the braided sleeve 8 contacts the waveguide 4 with sufficient pressure to provide the required damping action.

Thus, as seen through FIGS. 2a–2d, damping may occur through the pressure of outer layer 29 or through the tuning wire 5 trapped in inner layer 27 or through the crimping of metal sleeve 9 or by any other mechanism that applies the appropriate pressure to control the impedance matching along a predetermined length of the damping element 6 as determined by experiment.

The end 32 of damping element 6 facing end 31 of suspension sleeve 2 is preferably cut between a 40° and 50° angle and preferably about a 45° angle in order to properly match its impedance at that of the waveguide 4.

An additional way to minimize end reflections from the damping element 6 is to place another damping sleeve 33 of dissimilar material or size or pressure in front of damping element 6 (toward the suspension sleeve 2). Damping sleeve 33 should be designed to have a closer acoustic impedance match to the waveguide 4. That is, it should have less pressure, or smaller outer diameter, or lower mass density than damping element 6, or if it is an elastomer, it should have a low durometer, such that the front end reflection is minimized. Damping sleeve 33 includes a face 34 facing toward face 32 of damping element 6. Face 34 normally has a plane substantially perpendicular to the longitudinal axis of the waveguide 4. It should be noted that damping sleeve 33 may be used with any of the damping elements 6 of FIGS. 2a, 2b, 2c and 2d, and the depiction showing it only in FIG. 2a should not limit its generality. Further, the orientation of face 34 will not change if damping sleeve 33 is used with the damping sleeves 6 of FIGS. 2b, 2c or 2d, each of which has a slanted face 32. The face 34 will continue to have a plane substantially perpendicular to the longitudinal axis of the waveguide 4. Generally, this damping sleeve 33 does not damp as efficiently as the damping element 6, but it will damp the reflection from the damping element 6, thereby lowering the overall sonic energy leaving the damping system, damping element 6 acting as the primary damp and damping sleeve 33 acting as a secondary damp.

Still another method of minimizing the front end reflection coming from the damping element 6 is to expand the inside diameter of the damping element 6 at the front end. The end facing suspension sleeve 2. This can be accomplished by inserting a flaring tool in such front end of the damping element 6 just prior to placing it on the waveguide 4.

Still another method for minimizing the front end reflection coming from damping element 6 is to remove material from the outside diameter on such front end of damping element 6. This removal region should be in the range of 0.125" to 0.5" as measured from such front end of damping element 6. This can be accomplished, for example, by using a set of wire strippers to remove part of the elastomer that overlaps the braid.

The return wire 1 must pass over damping element 6 as shown in FIGS. 2a, 2b and 2d, or through damping element 6 as in FIG. 2c. In FIG. 2c, the return wire 1 is insulated (as it may be in all other cases) and can also act in a manner similar to the tuning wire 5 of FIG. 2b. In all events, the return wire 1 must then be attached to the tip of the waveguide 4 using solder or a crimp ring 7, and must be electrically connected to form the rest of the circuit to support the current pulse which begins in housing 17 and flows through waveguide 4 to return through return wire 1, which may be arranged as discussed in U.S. Pat. No. 3,898,555 or any other way known or to be known in the art.

The pressure applied by the inner layer 27 may be substantially uniform, but may also be nonuniform with less pressure on the side facing the housing 17 and more pressure on the side facing the end plug 20 to shorten the length of the damping element 6 for a given damping effectiveness while preventing reflection.

Alternately, the return wire 1 may be braided into suspension sleeve 2 or enclosure tube 3 may be conductive and the return wire 1 may be connected electrically to enclosure tube 3. Otherwise, in assembly, the return wire 1 and suspension sleeve 2 are inserted into enclosure tube 3. The waveguide 4 is then pulled into the suspension sleeve 2 because suspension sleeve 2 is sized such that the waveguide 4 is in loose contact with it but does not allow excessive lateral movement. Further, the damping element 6 is then slipped over the waveguide 4.

Figure 14:
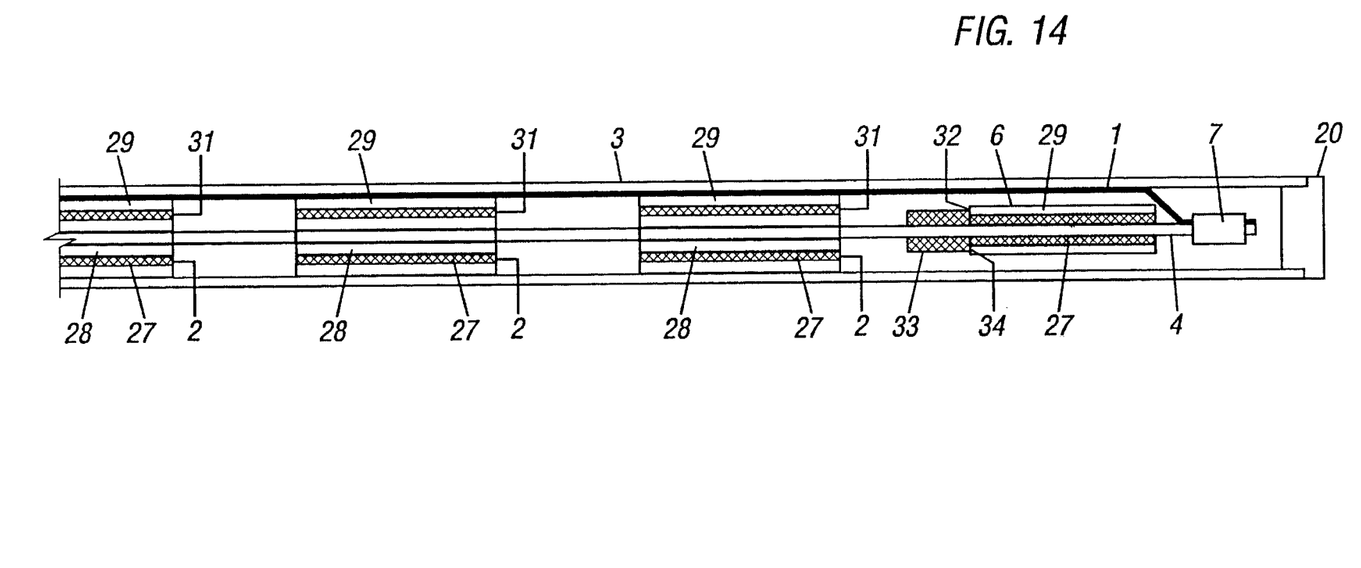
FIG. 14 illustrates a cross-sectional view of the sensing element assembly of an alternate embodiment of the present invention of FIG. 1 taken along section lines 2—2 of FIG. 1 showing a portion of the waveguide and surrounding partial sleeves and showing the damping element at the end of the waveguide.

Further, a series of short suspension sleeves 2 may be located along the length of waveguide 4, instead of a single continuous suspension sleeve 2, as shown in FIG. 14, although this is an alternate embodiment and believed to be more difficult to construct. In such a series, care should be taken in the spacing to decouple or otherwise suppress external or internal mechanical noise.

Figures 3, 4:
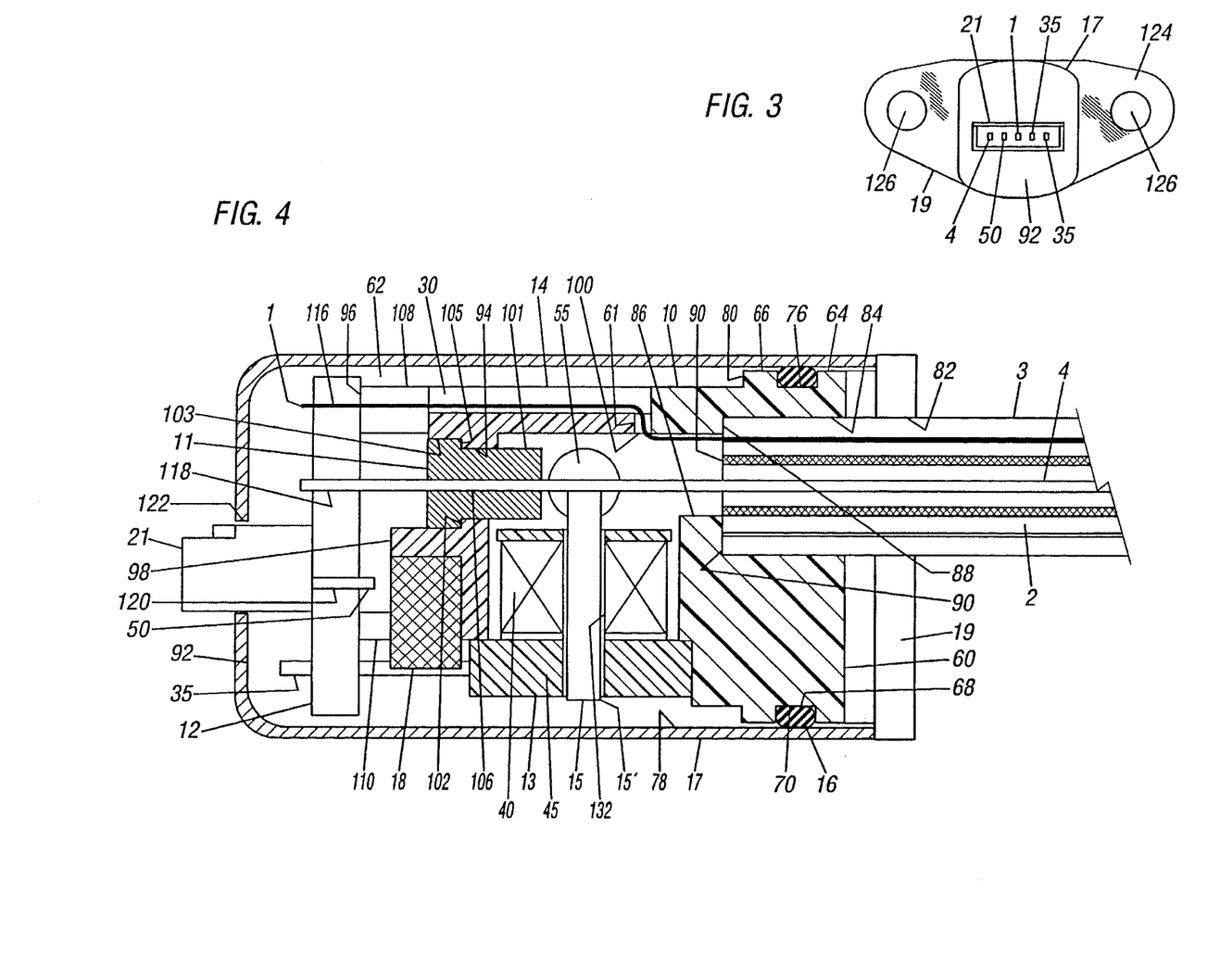
FIG. 3 depicts an elevated end view of the housing which shows the connector.
FIG. 4 is a cross-sectional view of the sensing element assembly of the preferred embodiment of the present invention of FIG. 1 taken along section lines 4—4 of FIG. 1 showing the cross-section of the housing and a portion of the waveguide and surrounding sleeves but not showing the damping mechanism.
Figure 5:
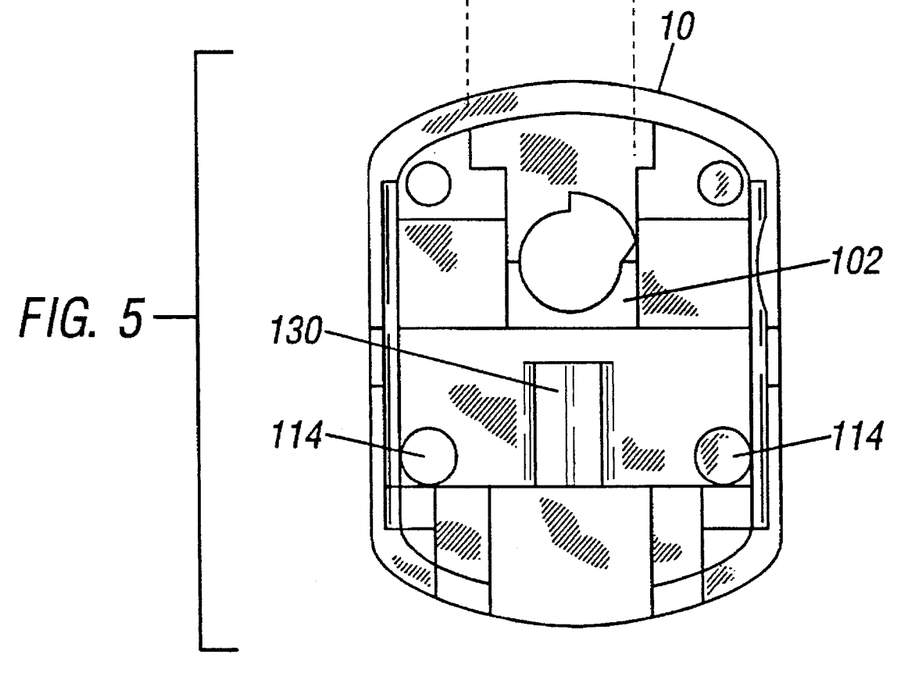
FIG. 5 is a plan view of the bracket of the preferred embodiment of the present invention.
Figure 6:
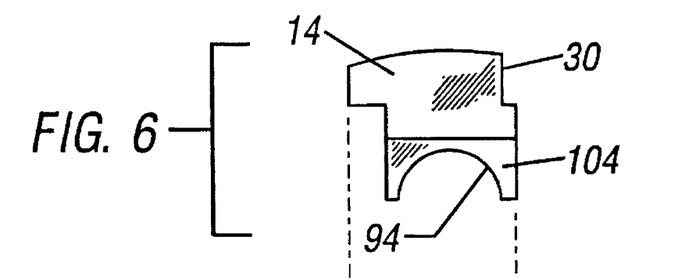
FIG. 6 is a plan view of the bracket cover of the preferred embodiment of the present invention.
Figure 9:
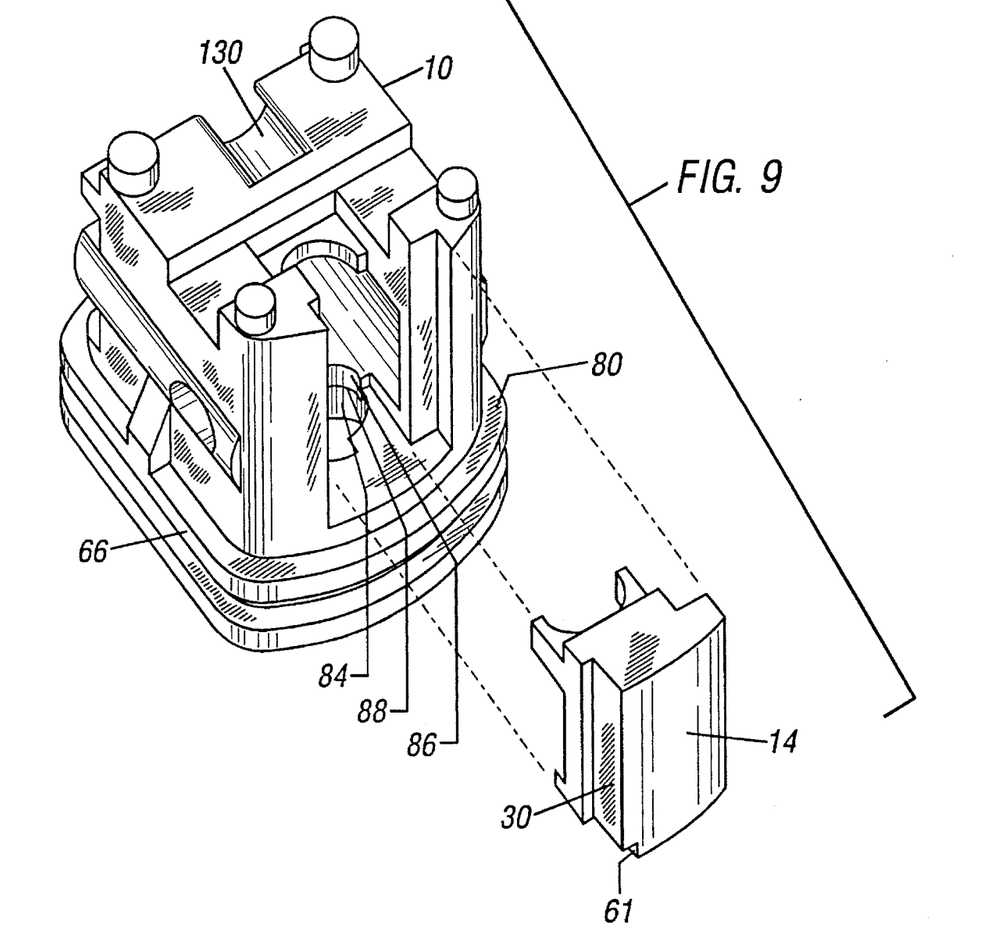
FIG. 9 is a second profile view of the bracket of the preferred embodiment of the present invention showing it juxtaposed with the bracket cover of the preferred embodiment of the present invention.

Return wire 1, suspension sleeve 2, enclosure tube 3 and waveguide 4 are supported in housing 17 by a bracket 10 (FIG. 4) preferably made of plastic. The details of the bracket 10 are shown in FIGS. 5–12. Bracket 10 includes a base 60, the outer diameter of base 60 being substantially equal to the inner diameter of the main enclosure 62 of housing 17. Base 60 includes two flanges 64, 66 located on either side of a recess portion 68 of base 60. This arrangement permits a groove 70 (FIG. 4) to be present between the two flanges 64, 66. A seal ring 16 is located inside groove 70 sealingly engaging the sidewalls 72, 74 of flanges 64, 66, respectively, and the outward facing wall 76 of recess 68, as shown in FIG. 4. As used above, the word "diameter" does not imply a circular shape. As best seen in FIG. 4 and from the shape of flanges 64, 66, the interior 62 of housing 17 is more rectangular in shape with two curved opposing sides. Thus, with the shape and sizing of flanges 64, 66, seal ring 16 also contacts the interior sidewall surface 78 of the main enclosure 62 of housing 17. Therefore, seal ring 16 acts to seal wiring and connectors interior in housing 17 to surface 80 of flange 66 (FIG. 4 and FIG. 9).

The end of housing 17 is closed by flange 19. An opening 82 is formed in flange 19 and sized to permit enclosure tube 3 to snugly fit through opening 82 and extend into an opening 84 formed in flanges 64, 66 and recess portion 68 of base 60 which is coaxial with opening 82 and of the same size as opening 82. Base 60 also includes a second opening 86 formed adjacent to flange 66 and coaxial with opening 84 but of smaller diameter than opening 84, thereby forming a shoulder 88 between openings 84, 86 against which abuts end 90 of the combination of suspension sleeve 2 and enclosure tube 3.

Figures 7, 8:
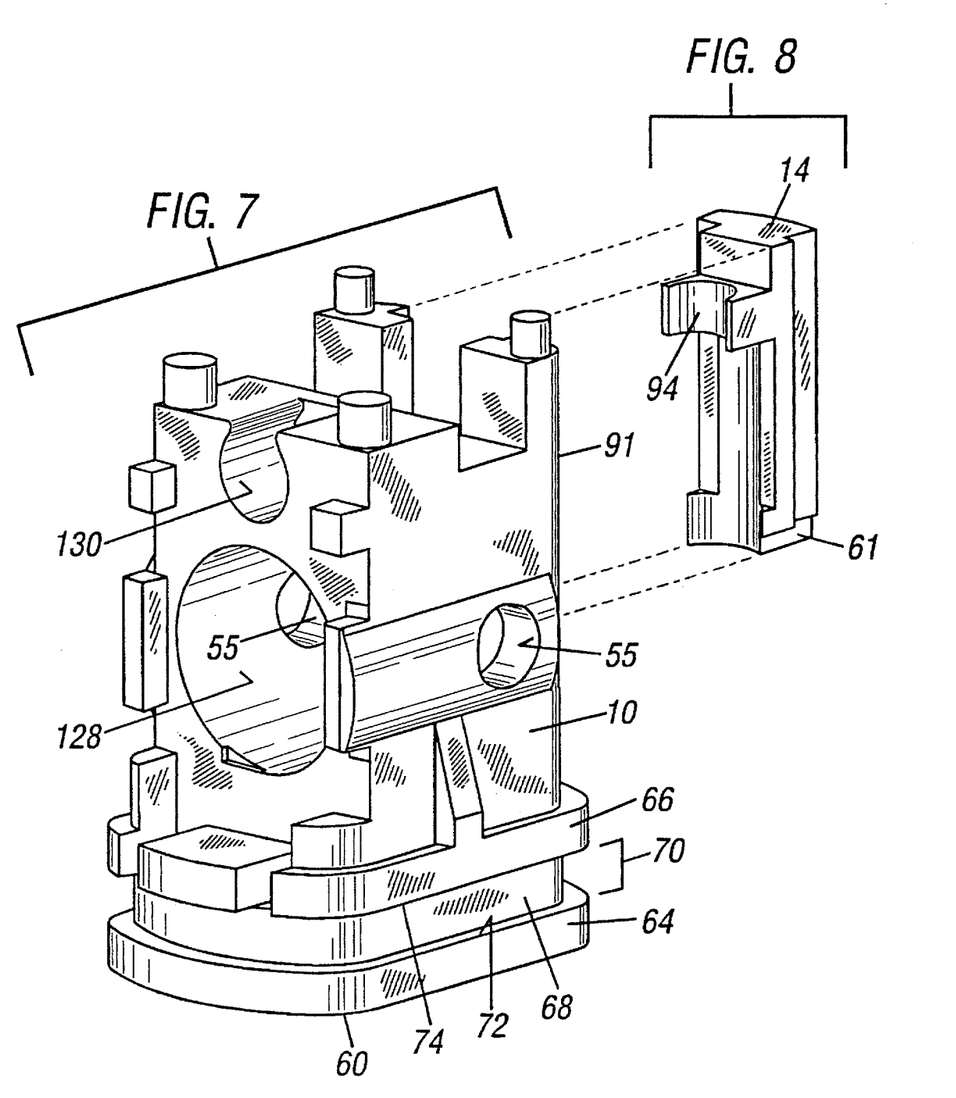
FIG. 7 is a first profile view of the bracket of the preferred embodiment of the present invention.
FIG. 8 is a first profile view of the bracket cover of the preferred embodiment of the present invention.

Bracket 10 further includes an extension 91 that extends beyond base 60 toward the end surface 92 of enclosure or housing 17. Extension 91 includes an intermediate opening 94 spaced between opening 86 and the end surface 96 of bracket 10 and end 98 of bracket 10. Opening 94 is coaxial with openings 84, 86. Opening 94 is also partially formed by bracket cover 14 (FIG. 8). In forming such opening 94, a lateral opening 100 is formed by the clearance between bracket 10 and a notch 61 in bracket cover 14. Opening 100 connects the interior between opening 94 and opening 86 with a channel 30, formed in bracket cover 14.

Figure 10:
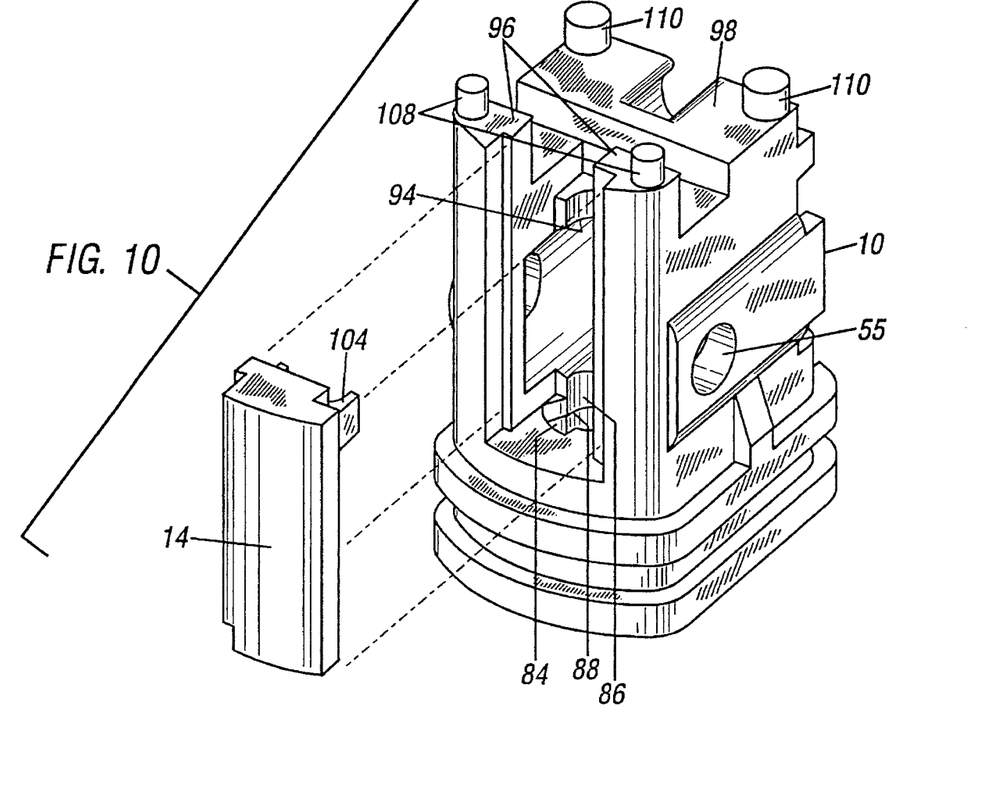
FIG. 10 is a third profile view of the bracket of the preferred embodiment of the present invention showing the bracket cover juxtaposed.
Figure 11:
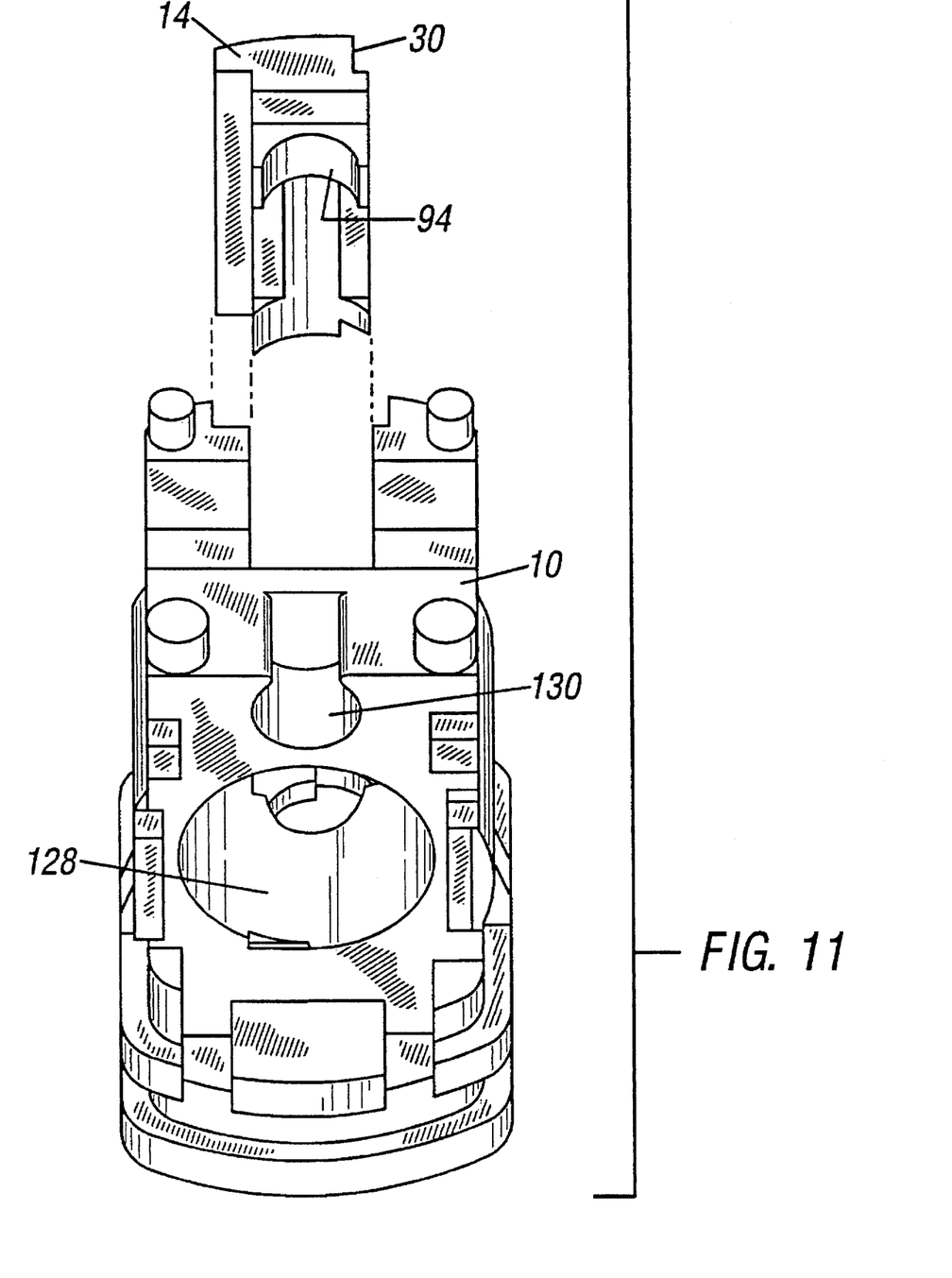
FIG. 11 is a view in profile of the end opposite to the end of FIGS. 9 and 10 of the bracket of the preferred embodiment of the present invention showing the bracket cover juxtaposed to it.
Figure 12:
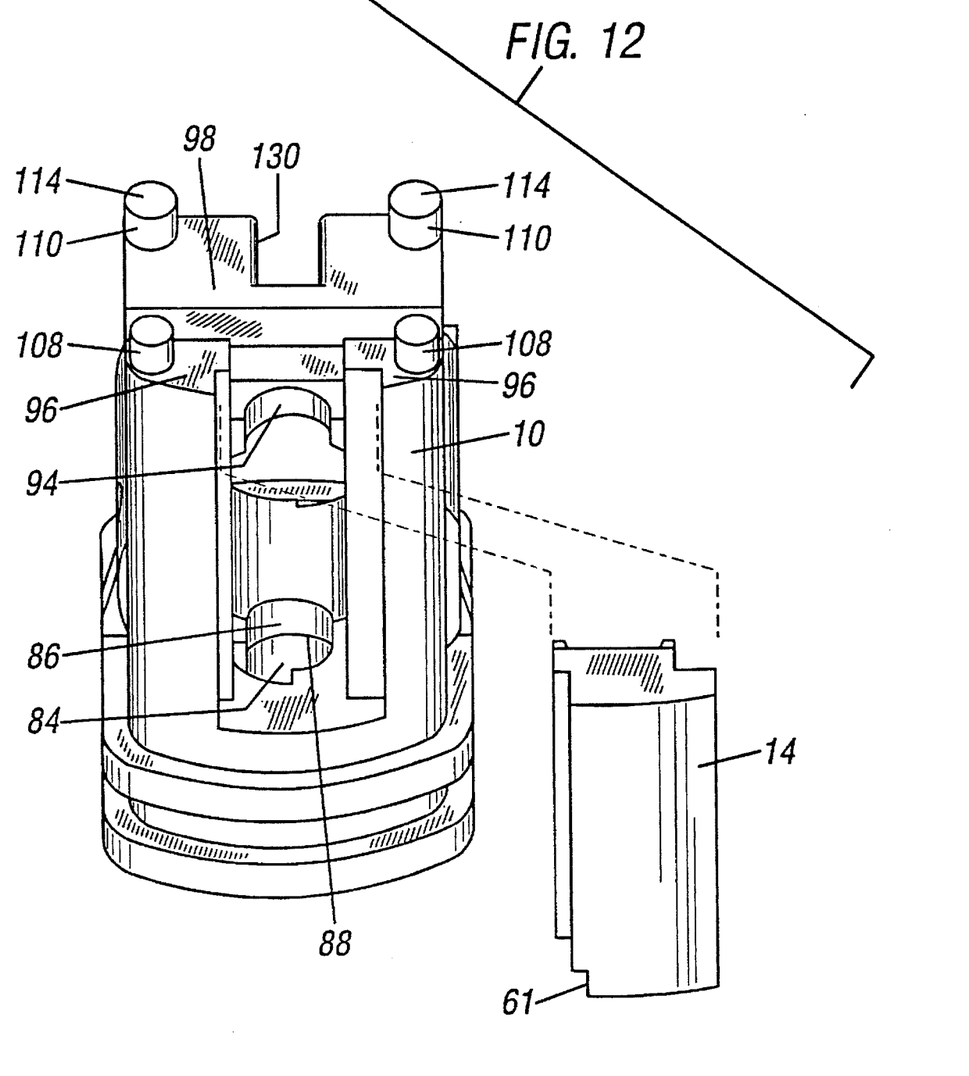
FIG. 12 is a different side view of the profile of the bracket of the preferred embodiment of the present invention.

With the combination of suspension sleeve 2 and enclosure tube 3 abutting or otherwise terminating at shoulder 88, both the return wire 1 and the waveguide 4 extend from end 90 into the space interior to housing 17. Return wire 1 is caused to pass through opening 100 and into channel 30 with a specific alignment described below. Waveguide 4 continues coaxial with opening 94 and is anchored by a waveguide anchor 11, preferably made of brass. Waveguide anchor 11 has a cylindrical shaped lower end 101 of diameter sufficient to fit into opening 94. A larger substantially rectangular cap 103 forms the top of waveguide anchor 11 with shoulder 105 formed therebetween. Shoulder 105 rests on surfaces 102, 104 which form the upper or inner facing surface of opening 94. Another opening 55 is provided in extension 91 whose axis is at right angles to the axis of openings 84, 86, 94 (FIG. 10). The identical opening 55 is formed in the other side of the extension 91 as shown in FIG. 7. The waveguide anchor 11 is sized such that in its seated position with surface 105 in contact with surfaces 102, 104, anchor 11 does not extend over opening 55. Waveguide anchor 11 further includes a central opening 106 coaxial with the axis of suspension sleeve 2 and waveguide 4. Opening 106 is sized to permit the insertion of waveguide 4 through it.

Cylindrical shaped elements 108, 110 extend from surface 98 and face toward the end 92 of housing 17. The upper surface 114 of cylindrical member 110 is substantially coplaner with the end surfaces 96 and act as supports for a printed circuit board 12 mounted near end 92. Cylindrical shaped elements 108 extend from surfaces 96 and engage reciprocally located features (not shown) in circuit board 12 to locate and align circuit board 12. Printed circuit board 12 is equipped with a series of openings 116, 118 and two not shown to permit return wire 1 to pass through opening 116 and waveguide 4 to pass through opening 118 and two additional leads from a pickup coil 13 yet to be discussed. In addition, printed circuit board 12 has openings 120 that permit leads 50 to pass from connector 21 through printed circuit board 12. Thus, return wire 1, waveguide 4, a dummy lead 50 and leads 35 of pickup coil 13 (yet to be discussed) all pass through printed circuit board 12 and are electrically connected by printed circuit board 12 with electrical connector 21 as five leads 50 (FIG. 3). Connector 21 physically rests on printed circuit board 12 and extends from it through an opening 122 formed in the end 92 of housing 17 to make connector 21 available to customers or users as shown in FIG. 3. Housing 17 is closed by flange 19 which may also include extensions 124 having openings 126 therethrough for mounting housing 17 in the customer's or user's device.

As shown in FIG. 7, two additional openings 128, 130 are included in extension 91 of bracket 10. The axis of each opening 128, 130 is perpendicular to the axis of the other openings discussed above. Opening 128 is larger than opening 130 and is sized to admit a pickup coil 13 (FIG. 4). Pickup coil 13 may be any type coil and is shown preferably with a high wire winding count but may be of any design without limiting the generality of the invention. The pickup coil 13 is shown in FIG. 4 as having copper windings 40 mounted on a bobbin base 45. Two leads 35 extend from pickup coil 13 through printed circuit board 12 where they are electrically connected as discussed above. Pickup coil 13 is mounted coaxially about a tape 15 reciprocally mounted in an opening 132 in pickup coil 13. Tape 15 extends from substantially the end of bobbin 45 facing outward towards housing 17 through the pickup coil 13 and to the waveguide 4 where it is connected to waveguide 4 by welding or other method of mechanical connection. Tape 15 does extend for a length 15' beyond the end of the bobbin 45. This length 15' provides constructive interference to the signal. The signal is developed as a voltage across the coil 13. The constructive interference is produced by the sonic wave continuing past the coil 13, reflecting from the end of tape 15, including all of the length 15' and arriving back at coil 13 with such time delay as to produce an additive effect. This causes constructive interference for any type of tape 15 or circuity with respect to the coil 13. An anchor or bracket for the end of tape 15 could alternately be used to set the length 15'. Tape 15 is typically made of a ferromagnetic or magnetostrictive material and may be of the same material as the waveguide 4 but have a different metallurgical treatment. Opening 128 is thus located in close proximity to channel 30 to place the pickup coil 13 in close proximity to return wire 1, thereby permitting a reduction in energy of the input pulse to waveguide 4.

Opening 130 is sized to receive a bias magnet 18 or unmagnetized magnet material which could be installed for later magnetization during the assembly process.

For assembly of the waveguide assembly into housing 17, the waveguide 4 is placed into the waveguide anchor 11 after suspension sleeve 2, waveguide 4 and enclosure tube 3 had been inserted into the openings 82, 84 of flange 19 and bracket 10. After the waveguide 4 is inserted into anchor 11, it is connected to the printed circuit board 12. The suspension sleeve 2 and enclosure tube 3 are held in place in the bracket 10 with adhesive or by suitable retaining elements not shown.

After the waveguide 4 is placed into the brass waveguide anchor 11 and connected to the printed circuit board 12, the pickup coil 13 is added. The return wire 1 is held in place while the bracket cover 14 is installed and then the tape 15 is welded or otherwise mechanically connected onto the waveguide 4 using openings 55. It is not necessary to attach the tape in the sequence set out above and the sequence should not be considered as limiting for all the inventions disclosed. The bias magnet 18 is then installed, or as indicated above unmagnetized magnetic material could have been installed earlier and then magnetized. Finally seal ring 16 is placed into groove 70 of bracket 10. Thereafter, the bracket 10 and the waveguide 4 and the flange 19 (if the flange 19 is used) as an assembly is inserted into the housing 17. The housing 17 is crimped and/or welded in place. Finally, the air inside the device is displaced by a dry, unreactive gas, and the end plug 20 is held in place with adhesive or other means.

The distance and location of return wire 1 with respect to waveguide 4 can be adjusted in any appropriate manner to permit the magnetic fields induced in these two wires to cancel each other. In addition, by properly routing return wire 1 in the area immediately adjacent the pick up coil 13, the ringing of the interrogation pulse can be reduced significantly, such as fifty percent or more. The size and magnetic properties, such as using copper of the sizes set out above for tuning wire 5 also have an effect on the ringing.

Transducer 25 is produced in one inch incremental lengths or some other incremental length on the order of one-half inch to four inches. This is done to reduce the total number of unique lengths to which waveguide 4, suspension sleeve 2, return wire 1, and enclosure tube 3 must be cut. This reduces the cost and complexity of manufacturing transducer 25, yielding a more cost effective product. Complete sensor assemblies which utilize transducer 25 can be manufactured in any length or incremental length desired. This is accomplished by providing a mounting means for transducer 25 within the complete sensor assembly which allows transducer 25 to be positioned axially at any point within ±½ inch of its median position within the complete sensor assembly. A transducer 25, the length of which is within ±½ inch of the length desired for the complete sensor assembly, can thus be positioned within the complete sensor assembly to provide precisely the sensing length desired.

Figure 13:
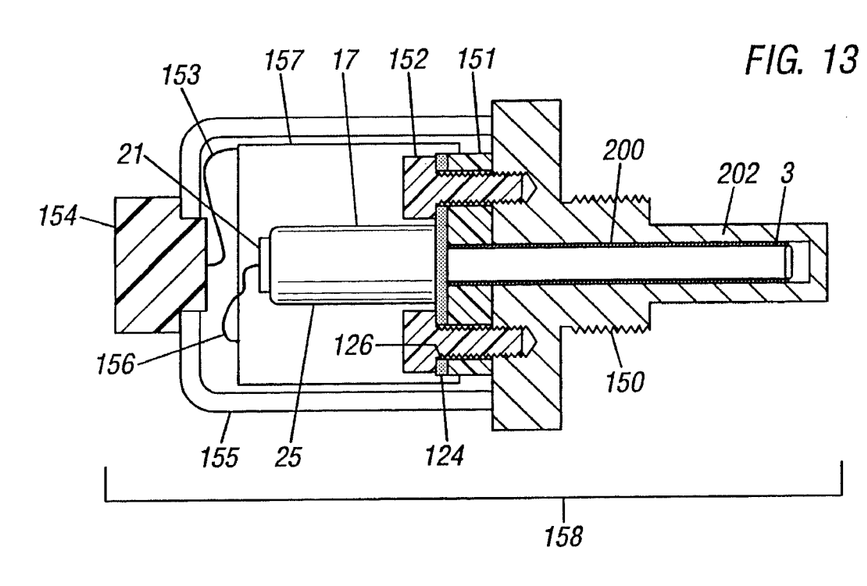
FIG. 13 illustrates a cross sectional view of a sensor assembly using the transducer of the preferred embodiment of the present invention.

FIG. 13 illustrates one possible implementation of the mounting means for using transducer 25 in one inch incremental lengths (or some other incremental length on the order of one-half inch to four inches) to produce sensor assemblies 158 in any length desired. Sensor assembly 158 includes an application housing 150 having an endcap 155. Transducer 25 is secured to application housing 150 using screw fasteners 152 passing through openings 126 of extensions 124 of mounting housing 17 or other suitable attachment means. When necessary to achieve a proper fit, a spacer block 151 may be positioned between transducer 25 and application housing 150. Spacer block 151 is utilized in a variety of thicknesses or is not used at all depending on the sensing length required of sensor assembly 158 and the standard length of the enclosure tube 3 containing waveguide 4 supplied as part of transducer 25. Fasteners 152 are also used in a variety of lengths to correspond to the thickness of spacer block 151. Transducer 25 is shown in FIG. 13 in the middle of the range of movement possible within endcap 155. Wire harness 156 carries signals and supply voltages between transducer 25 and customer or vendor supplied electronic circuit board 157. Wire harness 156 is of sufficient length and flexibility to allow transducer 25 to be secured anywhere within the allowed range of positions after being connected to electrical connector 21. Electronic circuit board 157 provides the interrogation and signal conditioning circuitry, as known in the art, necessary to communicate with the end user system and to provide the desired position feedback signals. A wire harness 153 is connected to the electronic circuit board 157 and carries signals and supply voltages between electronic circuit board 157 (FIG. 13) and an external connector 154 attached to endcap 155. External connector 154 provides the physical means for connecting to the end user system (not shown).

All of the features of a particular preferred embodiment of the waveguide assembly are not shown in the above disclosure in order to emphasize the generality of the disclosure. For example, a buffer circuit may be used to prevent coil saturation of pickup coil 13 when the pulse is initially introduced along waveguide 4. Such a circuit would help more closely couple the tape 15 and coil 13 to the waveguide 4.

Further, the transducer disclosed in this application may be fully electrically isolated or shielded including electrically shielded by housing 17 from all devices in which it is mounted by having mounting or spacer block 151 and screw fasteners 152 made of nonconducting material and having an insulating material 200 between tube 3 and external extension tube 202.

Because many varying and different embodiments may be made within the scope of the invention concept taught herein which may involve many modifications in the embodiments herein detailed in accordance with the descriptive requirements of the law, it is to be understood that the details herein are to be interpreted as illustrative and not in a limiting sense.

What is claimed as invention is:

1. A waveguide suspension for use with a waveguide and a return wire having an end remote from the electronics connected to the waveguide, comprising:
   a suspension sleeve, said suspension sleeve having an inner tubular, nonconducting layer coaxial with and surrounding the waveguide; and
   an outer tubular layer having means for maintaining the shape of said inner tubular layer;
   said suspension sleeve extending over a length of the waveguide.

2. The waveguide suspension of claim 1, wherein there is further included a damping element having
   an inner sleeve coaxial with the waveguide and surrounding the waveguide;
   pressure means connected to said inner sleeve for causing said inner sleeve to apply pressure to the waveguide;
   said damping element located between said inner sleeve and the remote end of the waveguide.

3. The waveguide suspension of claim 2, wherein said pressure means includes an outer sleeve.

4. The waveguide suspension of claim 3, wherein said outer sleeve is crimped to set the pressure of said inner sleeve on the waveguide.

5. The waveguide suspension of claim 4, wherein said outer sleeve is comprised of metal.

6. The waveguide suspension of claim 3, wherein said outer sleeve is comprised of a shape retaining material, said material exerting force on said inner sleeve to exert pressure on the waveguide.

7. The waveguide suspension of claim 6, wherein said outer sleeve is comprised of elastomer.

8. The waveguide suspension of claim 2, wherein there is further included a tuning wire, said tuning wire being adjacent to and extending longitudinally along the waveguide;
   said inner sleeve surrounding said tuning wire and said pressure means exerting pressure on said tuning wire through said inner sleeve.

9. The waveguide suspension of claim 2, wherein there is further included a return wire; and
   the return wire is adjacent to and insulated from the waveguide, the return wire and the waveguide being surrounded by said inner sleeve.

10. The waveguide suspension of claim 2, wherein said inner sleeve includes a face, facing towards the electronics, said face being at an angle with respect to a plane perpendicular to the axis of the waveguide.

11. The waveguide suspension of claim 10, wherein said angle is between 40° and 50°.

12. The waveguide suspension of claim 2, wherein said inner sleeve is comprised of a fine, hard material.

13. The waveguide suspension of claim 12, wherein said fine, hard material is ceramic.

14. The waveguide suspension of claim 12, wherein said fine, hard material is glass.

15. The waveguide suspension of claim 12, wherein stud fine, hard material is metal.

16. The waveguide suspension of claim 12, wherein said fine, hard material is polymer.

17. The waveguide suspension of claim 2, wherein said inner sleeve is stranded and the strand count is between eight and sixteen.

18. The waveguide suspension of claim 2, wherein said inner sleeve is stranded and the weave configuration is diamond, regular, or hercules.

19. The waveguide suspension of claim 1, wherein said inner tubular layer is an elastomer.

20. The waveguide suspension of claim 1, wherein said inner tubular layer is of a braided material.

21. The waveguide suspension of claim 20, wherein said braided material has eight to sixteen strands.

22. The waveguide suspension of claim 21, wherein said braided material has a pattern of diamond, regular, or hercules.

23. The waveguide suspension of claim 1, wherein said inner layer has an inner diameter sized to limit movement of the waveguide without constriction of the waveguide.

24. The waveguide suspension of claim 1, wherein the material of said inner layer is a hard, fine material.

25. The waveguide suspension of claim 24, wherein said fine, hard material is ceramic.

26. The waveguide suspension of claim 24, wherein said fine, hard materials is glass.

27. The waveguide suspension of claim 24, wherein said fine, hard material is metal.

28. The waveguide of suspension of claim 24, wherein said fine, hard material is polymer.

29. The waveguide suspension of claim 1, wherein said inner tubular layer is braided and the return wire is included in said braid.

30. The waveguide suspension of claim 1, wherein there is clearance between said inner tubular layer and the waveguide.

31. The waveguide suspension of claim 1, wherein said outer tubular layer is comprised of a soft material.

32. The waveguide suspension of claim 31, wherein said soft material is a silicone rubber.

33. The waveguide suspension of claim 1, wherein there is further included an enclosure tube, said enclosure tube being coaxial with and surrounding said suspension sleeve.

34. The waveguide suspension of claim 33, wherein said enclosure tube includes an end plug, said end plug being inserted into said enclosure tube at the end.

35. The waveguide suspension of claim 34, wherein there is an inert gas, said inert gas being enclosed within said enclosure tube and constrained from leakage from said end plug.

36. The waveguide suspension of claim 33, wherein the waveguide is electrically connected by the return wire, the return wire being electrically connected to said enclosure tube.

37. The waveguide suspension of claim 33, wherein there is further included a housing, said housing supporting said enclosure tube.

38. The waveguide suspension of claim 37, wherein there is further included an end flange, said end flange sealingly engaging said housing and including an opening, said opening being substantially of an inner diameter the same of the outer diameter of said enclosure tube and supporting said enclosure tube.

39. The waveguide suspension of claim 33, wherein the outer diameter of said suspension tube is sufficiently small to constrict movement of said suspension sleeve within said enclosure tube.

40. The waveguide suspension of claim 1, wherein the end includes a damping element coaxial with and surrounding the waveguide.

41. The waveguide suspension of claim 40, wherein the waveguide is bare at the end and said damping element surrounds the bare waveguide and is juxtaposed with said suspension sleeve.

42. The waveguide suspension of claim 1, wherein there is included an enclosure tube coaxial with and surrounding said suspension tube, the outer diameter of said suspension sleeve and the inner diameter of said enclosure tube being spaced such that the return wire fits in between said suspension sleeve and said enclosure tube.

43. The waveguide suspension of claim 1, wherein there are a plurality of said suspension sleeves located serially along the waveguide.

44. The waveguide of claim 43, wherein said suspension sleeves are located substantially along the entire length of the waveguide.

45. The waveguide suspension of claim 1, wherein said suspension sleeve extends substantially over the entire length of the waveguide.

46. A bracket for use in holding a waveguide and return wire and a holding coil coaxially about a tape and holding a magnet in an enclosure having an inner structure, comprising:

a first portion having a perimeter, said perimeter being juxtaposed with the inner structure;

said first portion having a first bore, said first bore sized to receive the waveguide and the return wire;

an extension, said extension connected to said first portion and having means for receiving the return wire from said first bore and spacing the return wire from the waveguide;

said extension having a second bore sized to receive the magnet and a third bore sized to receive the coil coaxially positioned about the tape;

said extension including an interior and said first and third bores oriented such that the tape intersects the waveguide in said interior; and opening means on said extension for facilitating connection of the tape to the waveguide in said interior.

47. A method for assembly of a waveguide and a return wire with a pick-up coil mounted coaxially about a tape, comprising the sequential steps of:

(A) Inserting the return wire and a suspension sleeve into an enclosure tube;

(B) Inserting the waveguide into the suspension sleeve;

(c) Inserting the enclosure tube into a bracket;

(D) Anchoring the enclosure tube in the bracket;

(E) Anchoring the waveguide in the bracket;

(F) Inserting the coil and the tape into the bracket; and (G) Connecting the waveguide to the tape within the bracket.

48. A bracket for use in holding a waveguide capable of having a magnetic field induced therein resulting from an interrogation pulse and return wire in an enclosure having an inner structure, comprising:

a first portion having a perimeter, said perimeter being juxtaposed with the inner structure;

said first portion having a first bore, said first bore sized to receive the waveguide and the return wire;

an extension, said extension connected to said first portion and having means for receiving the return wire from said first bore and spacing the return wire from the waveguide for permitting the magnetic fields induced in the return wire and the waveguide to cancel each other.

49. The bracket of claim 48 for use in holding a coil coaxially about a tape in the enclosure wherein said means is also for spacing the return wire from the waveguide in the vicinity of the coil to reduce ringing resulting from the pulse;

said extension having a second bore sized to receive the coil coaxially positioned about the tape.

50. A bracket for use in holding a waveguide, capable of having a magnetic field induced therein resulting from an interrogation pulse, and return wire, detected by a coil to produce an output signal, the bracket located in an enclosure having an inner structure, comprising:

a portion having a perimeter, said perimeter being juxtaposed with the inner structure;

said portion having a first bore, said first bore sized to receive the waveguide and the return wire, and a second bore, said second bore sized to receive the coil;

an extension, said extension connected to said portion and having means for receiving the return wire from said first bore and spacing the return wire from the coil.

51. The bracket of claim 50 wherein said means includes spacing means located near the coil for spacing the return wire from the waveguide for permitting the magnetic fields of the return wire and the waveguide to cancel each other.

52. The bracket of claim 50 for use with a magnet, wherein said portion having a third bore, said third bore sized to receive the magnet, said means spacing the return wire from the magnet to lower noise.

53. A sensor assembly for a waveguide and a return wire, comprising:

a first enclosure having a length greater than a base length;

a standard length second enclosure enclosing the waveguide and the return wire, said second enclosure sized to fit within said first enclosure, said standard length of said second enclosure being equal to said base length plus a fixed increment of said base length;

means for mounting said second enclosure within said first enclosure.

54. The waveguide suspension of claim 53, wherein said first fixed increment is between one-half inch and four inches.

55. The waveguide suspension of claim 54, wherein said first fixed increment is one inch.

56. The waveguide of claim 53, wherein said means includes a spacer block located between said first enclosure and said second enclosure.

57. A transducer for use with a sonic wave, comprising:

a waveguide;

a return wire electrically connected to said waveguide;

a suspension sleeve for suspending said waveguide and said return wire;

first means for terminating said waveguide and said return wire;

a tape, said waveguide and said tape being electrically connected;

a coil, said tape being received in said coil and having length means for reflecting the sonic wave from the end of said tape with time delay to produce an additive effect of the reflection to the sonic wave at said coil.

58. The transducer of claim 57, wherein said length means includes said tape having a length sufficient for reflecting the sonic wave from the end of said tape with time delay to produce an additive effect of the reflection to the sonic wave at said coil.

59. A transducer, comprising:

a waveguide;

a return wire electrically connected to said waveguide;

a first enclosure for enclosing said waveguide and said return wire;

a second enclosure terminating said waveguide and said return wire, said second enclosure supporting one end of said first enclosure and connected to said first enclosure;

a third enclosure, enclosing said first enclosure and including a first isolation, said first isolation electrically isolating said first enclosure from said third enclosure;

a fourth enclosure connected to said third enclosure and enclosing said second enclosure and including a second isolation, said second isolation electrically isolating said second enclosure from said third enclosure and said fourth enclosure.

60. A bracket for use in holding a waveguide and a tape for a magnetostrictive device comprising:

a body;

said body having a first bore, said first bore sized to receive the waveguide;

said body having a second bore sized to receive the tape;

said first and second bores oriented such that the tape intersects the waveguide; and opening means on said body for facilitating connection of the tape to the waveguide.

61. A method for assembly of a waveguide and a tape for a magnetostrictive device, comprising the sequential steps of:

(A) Inserting the waveguide into a bracket;

(B) Anchoring the waveguide in the bracket;

(C) Inserting the tape into the bracket; and (D) Connecting the waveguide to the tape through the bracket.

* * * * *